UNITED STATES PATENT OFFICE.

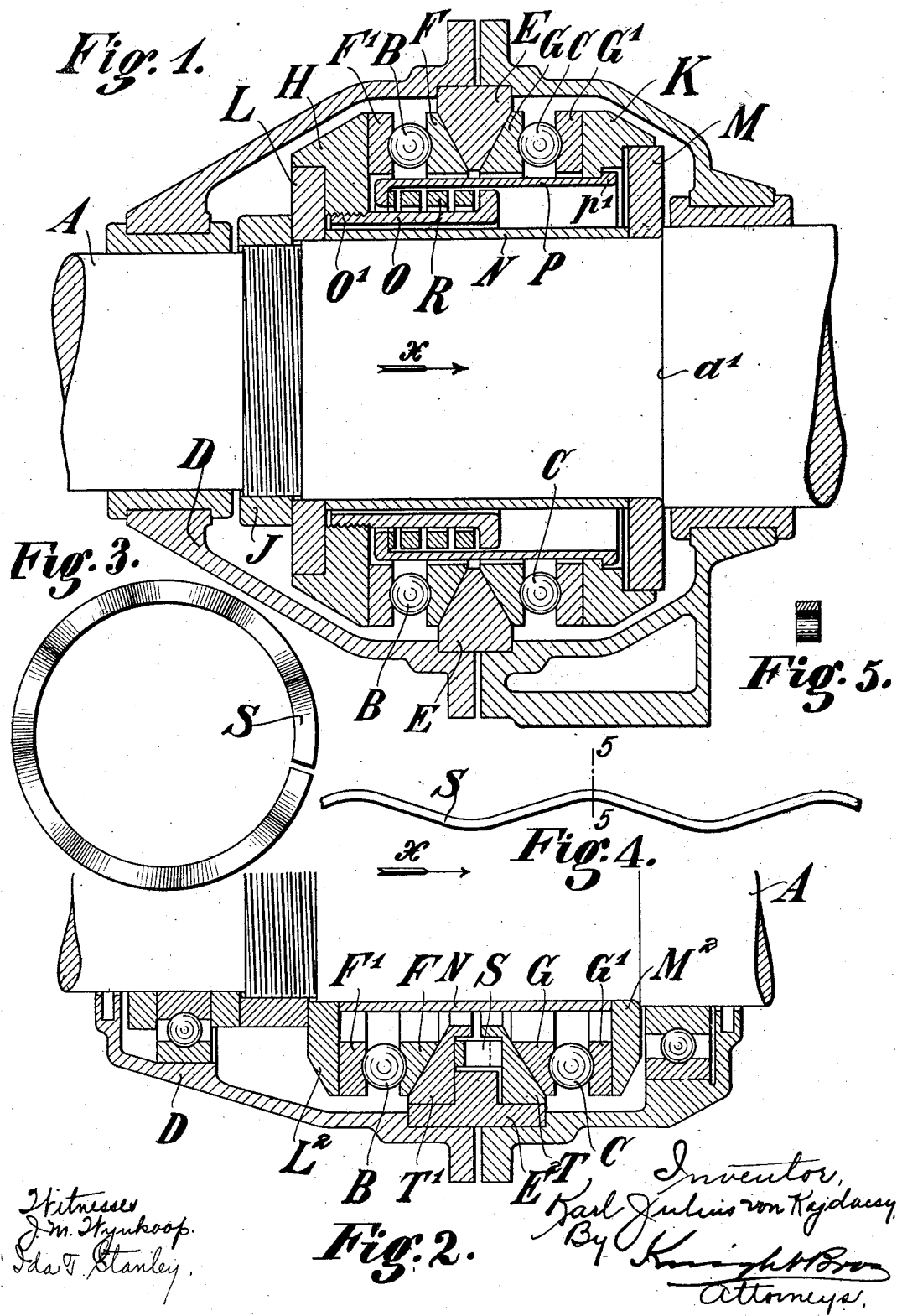

KARL JULIUS von KAJDACSY, OF KIEL, GERMANY, ASSIGNOR, BY MESNE ASSIGNMENTS, TO DEUTSCHE WAFFEN- UND MUNITIONSFABRIKEN, OF BERLIN, GERMANY.

DOUBLE-ACTING BALL THRUST-BEARING.

1,152,995.     Specification of Letters Patent.     Patented Sept. 7, 1915.

Application filed December 10, 1912. Serial No. 736.025.

*To all whom it may concern:*

Be it known that I, KARL JULIUS VON KAJDACSY, a citizen of the German Empire, residing at Kiel, Germany, have invented certain new and useful Improvements in Double-Acting Ball Thrust-Bearings, of which the following is a specification.

Double-acting thrust ball-bearings with one ball system for each direction of pressure, and with horizontal or inclined shaft, possess the disadvantage that axial play occurs in that one of the two ball systems which is temporarily without load and inactive. Consequently, the balls and the ball-races of this inactive ball system are readily displaced by the effect of their own weight or by centrifugal force. During the subsequent change in the direction of pressure such bearings have therefore a tendency to bind which results in the bearings running hot and in a rapid wearing out of the parts. This objectionable play is incident also to pressure bearings which are originally constructed without play, owing to the unavoidable wearing of their coöperating parts.

The present invention has for its purpose to provide a ball thrust bearing of the type referred to, in which the axial compactness of the two ball systems will be always maintained when unloaded as well as when loaded, so that lagging of the parts is precluded.

In the drawing forming part of this specification, in which an embodiment of the invention is shown by way of illustration, Figure 1 is an axial section of a ball thrust bearing arranged according to the invention, while Fig. 2 discloses a similar view of the lower half of a somewhat modified embodiment. Fig. 3 is a plan view of spring S; Fig. 4, an edge view of part of the spring developed; and Fig. 5, a cross section at 5—5 of Fig. 4.

Referring first to the embodiment disclosed in Fig. 1, A is a shaft, for example the propeller shaft of a ship, which transfers the thrust of the propeller to the ball thrust bearing fixedly arranged in the vessel. Between the two halves of the housing D of the thrust bearing, a pressure ring E is suspended, against which lie the inner raceways F and G of the ball systems B and C. The corresponding outer ball raceways $F^1$ and $G^1$ support themselves against annular intermediate pieces H and K which are displaceable to a slight degree, in an axial direction, upon the rings L, M. The rings L, M are secured against displacement in the direction of the axis of the shaft through means of a turned shoulder $a^1$ on the shaft and a band J mounted on the shaft, and sustained one against the other, by means of a box N. The box N is surrounded by cylindrical sleeves O, P, of two different diameters, which are provided on their inner ends with opposed flanges and receive between said flanges, a strong helical spring R, for which each flange serves as an abutment. The outer end of the sleeve P engages through a flange $p^1$, in a recess of the intermediate piece K, while the outer end $O^1$ of the sleeve O is rigidly connected through screw threads, with the intermediate piece H constructed as a nut. The threading between the sleeve O and the intermediate piece H serves moreover for the adjustment of the tension of the helical spring R as desired.

In explaining the operation, it will be assumed that the thrust imposed upon the shaft acts in the direction of the arrow $x$. The transfer of this thrust upon the housing or upon its foundation takes place in that case through the medium of the ball system B and, consequently, through the band J, ring L, intermediate piece H, raceway $F^1$, ball-row B, raceway F and thrust ring E. In this direction of thrust, the ball system C is relieved. Release of the balls and raceways is, however, prevented, since the sleeve P under the influence of the helical spring R presses the parts of this ball system against the thrust ring E, incident to which there is some existing play between the parts K and M, as will be seen from the drawing. If the direction of thrust upon the shaft changes, the force of this thrust will be transmitted to the housing D, through the medium of the ball system C, that is to say through the parts $a^1$, M, K, $G^1$, C, G and E, whereupon the same helical spring R which previously pressed the system C against the thrust ring E, now, in the same manner, effects the holding together of the parts of the ball system B. It is thus evident that the position of the parts of both ball systems relatively to the shaft A, regardless of the direction in which the thrust acts, remains permanently unchanged.

The embodiment of the subject-matter of the invention shown in Fig. 2 differs from that of Fig. 1, essentially, only in that the (for the time being) unloaded ball system will be pressed not against the pressure ring E², but against the rings L², M² upon the shaft. For this purpose, there is employed a system of plate springs S of wavy form, which are located in an annular recess formed by two rings T T¹. One of these springs S is illustrated in Figs. 3, 4 and 5. The two rings T T¹ are arranged to be displaceable against the thrust body E² to a certain degree, and transfer to the thrust body E², the force exerted upon them from the one or the other ball system (according to Fig. 2, the ball system B).

The described embodiments, in which there is employed for both ball systems, a single spring interposed between them, distinguish themselves by their especial simplicity. Except for this consideration, and without departing from the essence of the invention, there can be employed for each ball system, a special spring system and this can be supported against the housing or the parts of the shaft.

I claim:—

1. In a thrust ball bearing constructed for application to a shaft provided with a pair of thrust collars, spaced apart thereon; said thrust ball bearing comprising an intermediately located abutment member, ball race members with balls between them, said ball race members being constructed to engage with said abutment member and said thrust collars respectively, and being thereby adapted to transmit thrust directly from the shaft to said abutment member, a spring tending to press said ball race members against the balls, thereby sustaining the balls in position when no thrust is being transmitted from the shaft to the housing.

2. In a thrust ball bearing constructed for application to a shaft provided with a pair of thrust collars, spaced apart thereon; said thrust ball bearing comprising an intermediately located abutment member, two pairs of ball race members with balls between them, the members of each pair being constructed to engage with one of said thrust collars and said abutment member and being thereby adapted to transmit thrust from the shaft to the abutment member, a spring tending to press the ball race members against corresponding balls, thereby sustaining the inactive balls in position while the thrust is being transmitted to active balls from the shaft to said abutment member.

3. In a double acting thrust ball bearing for a shaft, a stationary bearing therefor, a thrust collar adapted to transmit thrust in opposite directions to the stationary bearing and a pair of abutments constructed to receive thrust in opposite directions from the shaft, two pairs of ball race members with balls between them, each pair rigidly engaging with the thrust collar on the one hand, and with one of said shaft abutments on the other hand, a spring tending to press the ball race members of each pair against the corresponding balls thereby sustaining the temporarily inactive balls in position while the thrust is being transmitted by the active balls from the shaft to the stationary bearing.

4. In a double acting thrust ball bearing for a shaft, a suitable stationary bearing therefor, a thrust collar mounted on said stationary bearing, a pair of ball systems suitably constructed to be suspended between abutments on the shaft, adapted to resist the thrust of the shaft in opposite directions, each of said systems comprising a pair of ball race rings with balls between them, an inner ring in each pair abutting against said thrust collar, a spring tending to press the rings against the balls thereby sustaining the inactive balls in position while the thrust is being transmitted by the active balls from the shaft to said thrust collar.

5. In a double acting thrust ball bearing for a shaft, provided with a pair of thrust abutments, a thrust collar constructed to be mounted on a suitable stationary bearing, a pair of ball systems suitably constructed to be suspended between the abutments on the shaft adapted to resist thrust of the shaft in opposite directions, each of said systems comprising a set of balls, an inner ball race ring engaging with said thrust collar and an outer ball race ring engaging with said shaft abutments, two telescoping sleeves having opposing collars engaging respectively with the outer ball race ring of the ball system, a spring between said sleeve collars adapted to telescope the sleeves and thereby to force together the two ball systems.

6. In a thrust ball bearing for shafts and a suitable housing therefor, ball race members with balls between them, said members being constructed to receive a shaft abutment and a housing abutment, respectively, and being thereby adapted to transmit thrust directly from the shaft to the housing, and a spring adapted to press said members against said balls thereby sustaining the balls in position while no thrust is being transmitted from the shaft to the housing.

7. In a thrust ball bearing for shafts and a suitable housing therefor, two pairs of ball race members with balls between them, the members of each pair being constructed to receive a shaft abutment and a housing abutment, respectively, and being thereby adapted to transmit thrust from the shaft to the housing in opposite directions, and a spring adapted to press the ball race members of each pair against the corresponding balls thereby sustaining the inactive balls in position while the thrust is being transmitted directly by the active balls from the shaft to the housing.

8. In a double acting thrust ball bearing for shafts and a suitable housing therefor, a thrust collar adapted to transmit thrust in opposite directions to the housing and a pair of abutments constructed to receive thrust in opposite directions from a shaft, two pairs of ball race members with balls between them, each pair rigidly engaging with the thrust collar on the one hand and with one of said shaft abutments on the other hand, and a spring adapted to press the ball race members of each pair against the corresponding balls thereby sustaining the temporarily inactive balls in position while the thrust is being transmitted by the active balls from the shaft to the housing.

9. In a double-acting thrust ball bearing for shafts and a suitable housing therefor, a thrust collar constructed to be mounted in the housing, a pair of ball systems suitably constructed to be suspended between abutments on the shaft to adapt them to resist the thrust of the shaft in opposite directions, each of said systems comprising a pair of ball race rings with balls between them, the inner ring in each pair abutting against said thrust collar; a spring adapted to press the rings against the balls thereby sustaining the inactive balls in position while the thrust is being transmitted by the active balls from the shaft to said thrust collar.

10. In a double-acting thrust ball bearing for shafts and a suitable housing therefor, a thrust collar constructed to be mounted in the housing, a pair of ball systems suitably constructed to be suspended between abutments on the shaft to adapt them to resist thrust of the shaft in opposite directions, each of said systems comprising a set of balls, an inner ball race ring engaging with said thrust collar and an outer ball race ring engaging with the respective shaft abutments; two telescoping sleeves having opposing collars engaging respectively with the outer ball race ring of the ball systems, a spring between said sleeve collars adapted to telescope the sleeves and thereby to force together the two ball systems.

In testimony whereof I have affixed my signature in presence of two witnesses.

KARL JULIUS von KAJDACSY.

Witnesses:
    JULIUS ROJRKE,
    KARL FRIEDR. FREUPEL.

Copies of this patent may be obtained for five cents each, by addressing the "Commissioner of Patents, Washington, D. C."